Aug. 30, 1960
T. W. HIBBS
2,950,522
STOCK FEEDER FOR MACHINE TOOLS
Filed Oct. 24, 1958
2 Sheets-Sheet 1
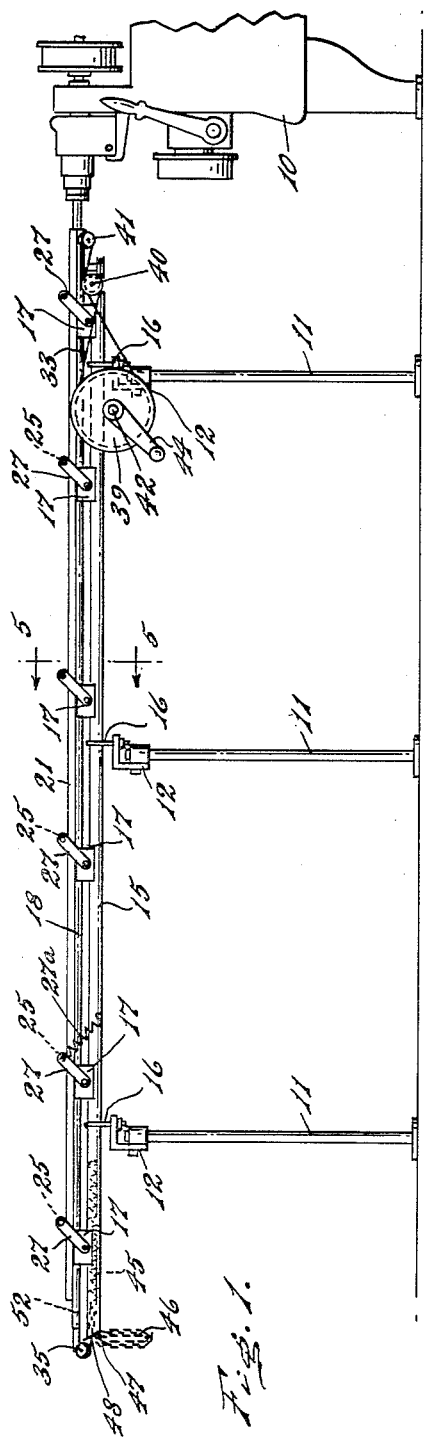
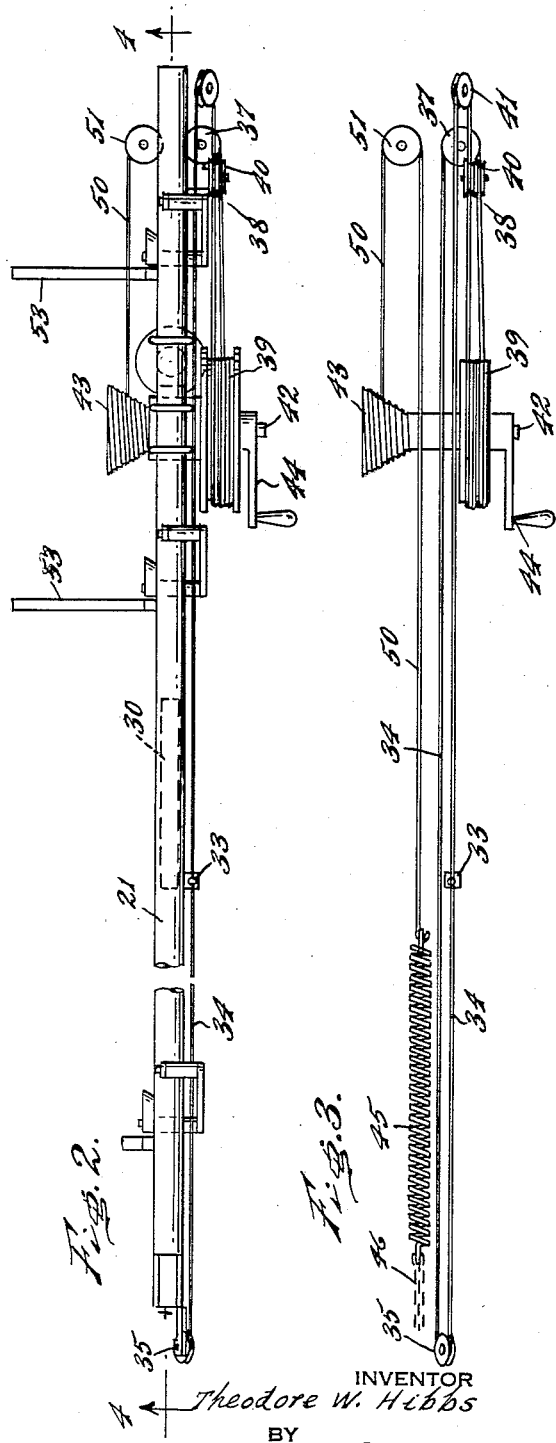
INVENTOR
*Theodore W. Hibbs*
BY
*B. T. Wolkensmith*
ATTORNEY Aug. 30, 1960
T. W. HIBBS
2,950,522
STOCK FEEDER FOR MACHINE TOOLS
Filed Oct. 24, 1958
2 Sheets—Sheet 2
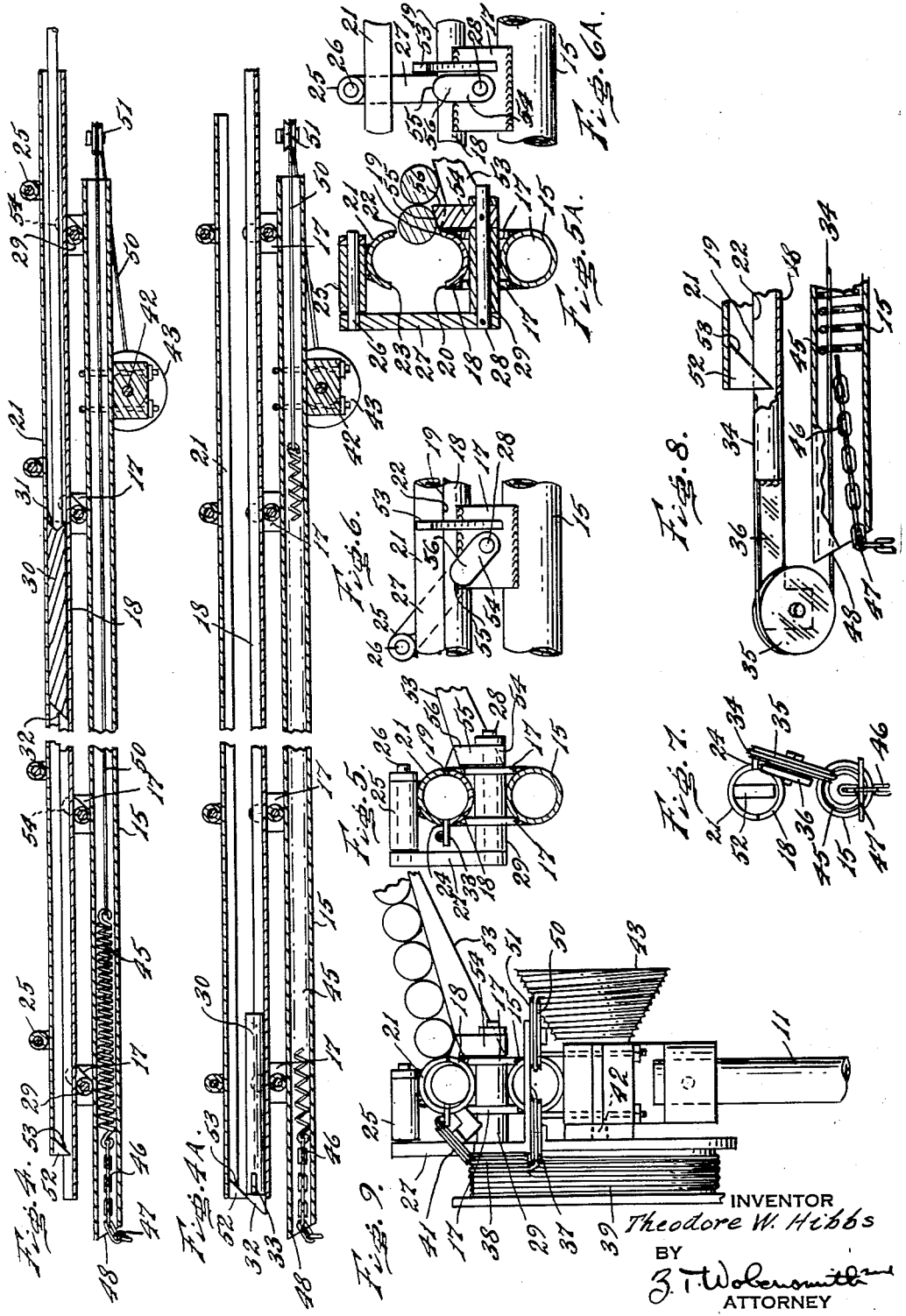
INVENTOR
Theodore W. Hibbs
BY
ATTORNEY United States Patent Office 2,950,522
Patented Aug. 30, 1960

2,950,522
STOCK FEEDER FOR MACHINE TOOLS
Theodore W. Hibbs, 406 W. Vine St., Hatfield, Pa.
Filed Oct. 24, 1958, Ser. No. 769,437
7 Claims. (Cl. 29—93)

This invention relates to stock feeders for turret lathes and other machine tools, and more particularly to feeders for bar, rod or other stock.

It is the principal object of the present invention to provide a stock feeder for turret lathes and other machine tools which is simple and sturdy in construction and reliable in operation.

It is a further object of the present invention to provide a stock feeder for turret lathes and other machine tools having provisions for storing a plurality of bars, rods and the like for successive feeding.

It is a further object of the present invention to provide a stock feeder for turret lathes and other machine tools in which the feeding is accomplished in a simple but effective manner.

It is a further object of the present invention to provide a stock feeder for turret lathes and other machine tools which is substantially self-contained, which employs a spring for imparting the force for feeding, and in which the force of the spring is utilized in an improved manner.

It is a further object of the present invention to provide a stock feeder for turret lathes and other machine tools in which a tension spring is utilized for imparting the force for feeding, and in which the spring is of relatively short length in contracted condition.

It is a further object of the present invention to provide a stock feeder for turret lathes and other machine tools in which separable guideways are provided for the reception of the stock to be fed, and in which the supporting frame for the guideways is utilized for the reception of an actuating spring.

It is a further object of the present invention to provide a stock feeder for turret lathes and other machine tools in which improved provisions are employed for successively supplying rods, bars, and the like, to be fed.

It is a further object of the present invention to provide a stock feeder for turret lathes and other machine tools which is readily adjusted to set position for stock feeding, and which can be quickly and easily restored to a position for the introduction of a succeeding rod, bar or the like, to be fed.

Other objects and advantageous features of the invention will be apparent from the description and claims.

The nature and characteristic features of the invention will be more readily understood from the following description, taken in connection with the accompanying drawings forming part thereof, in which:

Figure 1 is a front elevational view of a stock feeder for turret lathes and other machine tools in accordance with the invention;

Fig. 2 is a top plan view, enlarged, of the structure shown in Fig. 1;

Fig. 3 is a diagrammatic view showing the actuation of the feeding mechanism;

Fig. 4 is a fragmentary vertical sectional view, enlarged, taken approximately on the line 4—4 of Fig. 2 and showing one position of the guideways and feeder bar;

Fig. 4A is a view similar to Fig. 4 showing the position of the guideways and feeder bar for the introduction of a piece of stock for feeding;

Fig. 5 is a fragmentary vertical sectional view, enlarged, taken approximately on the line 5—5 of Fig. 1;

Fig. 5A is a view similar to Fig. 5 showing the guideways in open position for the introduction of a piece of stock to be fed;

Fig. 6 is a fragmentary rear elevational view of the structure shown in Fig. 5;

Fig. 6A is a fragmentary rear elevational view similar to Fig. 6 and showing the structure illustrated in Fig. 5A;

Fig. 7 is a fragmentary end elevational view, enlarged, as seen from the left of Fig. 1;

Fig. 8 is a fragmentary end elevational view, enlarged, at the left hand end of Fig. 1, parts being shown in section to illustrate the details of construction; and Fig. 9 is an end elevational view, enlarged, as seen from the right in Fig. 1.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to the drawings, a fragmentary portion of a turret lathe or the like is shown at 10 to which the stock, in the forms of bars, rods and the like, is to be supplied for manufacture of parts of the desired sizes and shapes.

A plurality of spaced vertical supporting legs 11 are provided, resting at their lower ends upon the floor. The legs 11 have secured at their upper ends adjustable supporting brackets 12 to which a lower horizontally disposed elongated frame tube 15 is secured in any desired manner, such as by U-bolts 16. The frame tube 15 has secured thereto, at a plurality of spaced locations therealong, frame plates 17 to the upper ends of which a horizontally disposed elongated lower guideway 18 is secured by welding or in any other desired manner.

The lower guideway 18 is substantially semicylindrical in transverse cross section and can have one longitudinal terminal edge 19 thereof inwardly beveled, as indicated particularly in Fig. 5A, and the other longitudinal terminal edge 20 disposed a predetermined distance below a horizontal plane passing through the transverse center of curvature thereof.

An upper elongated guideway 21 is provided, also of substantially semicylindrical shape in cross section, and having one longitudinal terminal edge 22 for substantial meeting relation with the edge 19 of the lower guideway 18 and the other longitudinal terminal edge 23 disposed so as to be in spaced relation to the edge 20 of the guideway 18 in lowered or lowermost position to provide a slot 24.

The upper guideway 21 has a plurality of transversely disposed sleeves 25 secured thereto at spaced locations and having pins 26 therein. The pins 26 are connected to levers 27 secured to pivot shafts 28 mounted in sleeves 29 extending through the frame plates 17. One or more springs 27a can be provided between the upper ends of the levers 27 and the frame tubes 15 for urging the upper guideway 21 downwardly.

It will be noted that by reason of the mounting of the upper guideway 21 this upper guideway 21 can be raised with respect to the lower guideway 18 to permit the introduction of the stock to be fed, as hereinafter explained.

A pusher bar 30 is provided, supported by the lower guideway 18 and having its end 31 for engagement with the stock formed with a conical opening for centering the stock whether the stock is at rest or rotating, and having its other end provided with a beveled face 32 for purposes to be explained.

The pusher bar 30 has an outwardly extending actuating arm 33 movable in the slot 24 and has a flexible cable 34 secured thereto. The cable 34 extends along the exterior of the guideways 18 and 21, interiorly with respect to the levers 27, and extends over a supporting pulley 35 mounted at the end of the lower guideway 18 on a bracket 36 welded thereto.

The cable 34 then extends lengthwise within the frame tube 15 and over a pulley 37 and guide pulley 38 and is connected to a resetting drum 39 with a sufficient number of turns around the drum to permit of the desired movement. The cable is then wound around the drum a sufficient number of turns to permit the desired movement and extends from the drum 39 over a guide pulley 40 and pulley 41 supported by the frame tube 15 and to the actuating arm 33 to which it is secured.

The drum 39 is secured to a horizontal shaft 42 supported by the frame tube 15 and the shaft 42 also has a conical drum 43 secured thereto for movement therewith. The drum 43 can have cable guide grooves 43a thereon for aiding in winding a flexible cable 50 thereon. A crank 44 is secured to the shaft 42 for rotating the drums 39 and 43.

One end of the frame tube 15, shown at the left of Figs. 1, 2, 4, 4A and 8, has a tension spring 45 therein. The tension spring 45 has a chain 46 connected to one end thereof for adjusting the tension by insertion of a pin 47 through a selected link of the chain 46. The pin 47 abuts on a downwardly inclined end 48 of the frame tube 15. The other end of the spring 45 has the flexible cable 50 connected thereto. The cable 50 extends interiorly within the frame tube 15 and around a guide pulley 51 and then to the drum 43 to which it is secured.

The spring 45, acting in tension, provides a force, and the cone angle and size of the conical drum 43 provides for winding the cable so as to equalize the force of the spring 45 and reduce the motion required of the movable end of the spring 45, a two to one or three to one reduction having been found suitable.

At the outer end of the upper guideway 21 a wedge plate 52 is provided having an inner inclined surface 53 for engagement by the beveled end face 32 of the pusher bar 30 for raising the upper guideway 21 upon the engagement of the face 32 with the wedge plate 52.

Two or more of the frame plates 17 have extending outwardly and upwardly therefrom stock supporting arms 53 upon which the stock, in the form of bars, rods and the like, is supported for delivery between the guideways 18 and 21 when the upper guideway 21 is raised.

In order to effect the delivery of a piece of stock, each of the shafts 28 has a feed cam 54 thereon, which has a face 55 rounded as seen from the end in Figs. 6 and 6A, and inclined inwardly towards the guideways 18 and 21, as will be seen in Figs. 5 and 5A. The outer edges of the feed cams 54 serve to lift and permit the sliding of a piece of stock across the edge 19 and into position in the lower guideway 18, while the outer faces 56 of the feed cams 54 restrain the next piece of stock and effect a separation thereof so that only a single piece of stock is delivered upon each elevation of the upper guideway 21 on its pivotal mountings.

The inclination of the arms 53 is such as to utilize the weight of the successive pieces of stock for urging the lower pieces of stock downwardly towards their delivered positions within the lower guideway 18.

The mode of operation will now be pointed out.

When it is desired to insert a piece of stock this is placed upon the stock supporting arms 53 and slides downwardly along said arms towards the lower guideway 18.

The pusher arm 30 is actuated by rotating the crank 44 to rotate the drums 39 and 43 so that by the engagement of the cable 34 on the drum 39 the pusher arm 30 can be moved to the left, as seen in Figs. 1, 2, 3, 4, 4A and 8, to bring the beveled face 32 into engagement with the inclined face 53. By this engagement, the upper guideway 21 is moved upwardly by reason of the pivotal mounting provided by the levers 27. The terminal edge 22 of the upper guideway 21 is separated from the terminal edge 19 of the lower guideway 18, and a piece of stock, carried by the face 55 of the cam 54, slides downwardly along the face 55 and across the edge 19 of the guideway 18 into position in the guideway 18.

The guideway 21 can be lowered or permitted to lower. The positive lowering of the guideway 21 can be effected by turning the crank 44 to advance the pusher bar 30 so that the face 32 is out of engagement with the face 53. The upper guideway 21 will then move downwardly either by its own weight or assisted by the springs 27a, if these springs are employed.

It will also be noted that the pusher bar 30 is urged by the force exerted on the actuating arm 33 and this also tends to withdraw the pusher bar from the position where it retains the upper guideway 21 in an elevated position.

Rotation of the shaft 42 to position the pusher bar 30 to the left effects rotation of the drum 43 to wind the cable 50 onto the drum 43. At the same time the spring 45 is extended to impart a force tending to unwind the cable 50 from the drum 43, rotation of the drum 43 in this manner being effective for rotating the shaft 42 and the drum 39. Rotation of the drum 39 actuates the cable 34, as previously indicated, to move the actuating arm 33 and the pusher bar 30 to which it is connected for urging the stock towards the right and through the hollow chuck of the lathe 10 as controlled by the lathe 10.

Upon the completion of the feeding of the stock, by a stroke of the pusher bar 30 to the right, the pusher bar 30 can be readily retracted, by rotation of the shaft 42 by the crack 44 to return the pusher bar to the position for elevating the upper guideway 21 and permitting the delivery of another piece of stock into the guideway 18, as previously explained.

The interconnection of the frame tube 15 and the lower guideway 18 by the plates 17 provides a strong and relatively rigid structure which is light in weight, and the location of the spring 45 within the frame tube 15 retains the spring free from tampering or damage.

The upper guideway 21, when in lowered position, provides, with the lower guideway 18, an enclosure through which the stock is advanced and is guided during the advance.

I claim:

1. Apparatus for feeding elongated stock to a machine tool comprising a horizontal elongated frame tube, a lower elongated hollow guideway carried by said frame tube, an upper elongated hollow complemental guideway separable with respect to said lower guideway for the insertion of a piece of stock within said guideways, a pusher member slidably guided in said guideways, said guideways having a slot therealong, an actuator for said pusher member movable along said slot, an elongated spring, operating connections interposed between said spring and said actuator for applying a pushing force to said actuator, said upper guideway having an actuating portion at one end thereof, and an actuating portion on said pusher member for engagement with said upper guideway actuating portion at a predetermined portion of the stroke of said pusher member, thereby to elevate said upper guideway.

2. Apparatus for feeding elongated stock to a machine tool comprising a horizontal elongated frame tube, a lower elongated hollow guideway carried by said frame tube, an upper elongated hollow guideway complemental to said lower guideway and separable with respect thereto, said upper guideway in one position acting with said lower guideway to guide a piece of stock, said lower guideway having inclined arms extending to one side thereof below the upper margins thereof for the reception of a plurality of pieces of stock, members for separating said guideways to permit the insertion of a piece of stock within said guideways, members for elevating a piece of stock from said arms for delivery to the interior of said guideways in separated condition of said guideways, said members for separating said guideways holding said guideways in said one position for guiding the stock, a pusher member slidably guided in said guideways, said guideways having a slot therealong, an actuator for said pusher member movable along said slot, an elongated spring, and operating connections interposed between said spring and said actuator for applying a pushing force to said actuator.

3. Apparatus for feeding elongated stock to a machine tool comprising a horizontal elongated frame tube, a lower elongated hollow guideway carried by said frame tube, an upper elongated hollow guideway complemental to said lower guideway and separable with respect to said lower guideway to permit the insertion of a piece of stock within said guideways, said lower guideway having a plurality of longitudinally spaced horizontal shafts extending transversely therebelow, actuating arms carried by said shafts and pivotally connected to said upper guideway for elevating said upper guideway, said actuating arms holding said guideways in one position for guiding the stock, members carried by said shafts and movable therewith for successively feeding a piece of stock to the interior of said guideways in elevated condition of said upper guideway, a pusher member slidably guided in said guideways, said guideways having a slot therealong, an actuator for said pusher member movable along said slot, an elongated spring, and operating connections interposed between said spring and said actuator for applying a pushing force to said actuator.

4. Apparatus for feeding elongated stock to a machine tool comprising a horizontal elongated frame tube, a lower elongated hollow guideway carried by said frame tube, an upper elongated hollow guideway complemental to said lower guideway and separable with respect thereto, said upper guideway in one position acting with said lower guideway to guide a piece of stock and in another position permitting the insertion of a piece of stock within said guideways, said lower guideway having inclined arms extending to one side thereof below the upper margin thereof for the reception of a plurality of pieces of stock, a plurality of longitudinally spaced horizontal shafts extending transversely therebelow, actuating arms carried by said shafts and pivotally connected to said upper guideway for elevating said upper guideway, cam members carried by said shafts and movable therewith for elevating a piece of stock from said inclined arms and urging said piece into said lower guideway in elevated condition of said upper guideway, said actuating arms holding said guideways in said one position for guiding the stock, a pusher member slidably guided in said guideways, said guideways having a slot therealong, an actuator for said pusher member movable along said slot, an elongated spring, and operating connections interposed between said spring and said actuator for applying a pushing force to said actuator.

5. Apparatus for feeding elongated stock to a machine tool comprising a horizontal elongated frame tube, a lower elongated hollow guideway carried by said frame tube, an upper elongated hollow guideway complemental to said lower guideway and separable with respect thereto, members for separating said upper guideway with respect to said lower guideway to permit the insertion of a piece of stock within said guideways, a pusher member slidably guided in said guideways, said guideways having a slot therealong, an actuator for said pusher member movable along said slot, an elongated spring, and operating connections interposed between said spring and said actuator for applying a pushing force to said actuator, said operating connections including a first drum and a second drum connected to said first drum for rotation therewith, a flexible cable extending along said guideways, a support for said cable at one end of said guideways, additional supports for said cable at the other end of said guideways, said cable being secured to said actuator and extending to and around said first mentioned support then to one of the supports at the other end and to and around one of said drums in gripping engagement therewith and then around the other support at the other end and to said actuator, a second flexible cable extending from said spring to a support at said other end of said guideways and then to said second drum for accumulation thereon upon extension of said spring, a crank movable with said drums for extending said spring, and members for actuating said guideway separating members.

6. Apparatus for feeding elongated stock to a machine tool comprising a horizontal elongated frame tube, a lower elongated hollow guideway carried by said frame tube, an upper elongated hollow guideway complemental to said lower guideway, members for elevating said upper guideway with respect to said lower guideway for the insertion of a piece of stock within said guideways, a pusher member slidably guided in said guideways, said guideways having a slot therealong, an actuator for said pusher member movable along said slot, an elongated spring, and operating connections interposed between said spring and said actuator for applying a pushing force to said actuator, said operating connections including a cylindrical drum and a conical drum connected to said cylindrical drum for rotation therewith, a flexible cable extending along said guideways, a support for said cable at one end of said guideways, additional supports for said cable at the other end of said guideways, said cable being secured to said actuator and extending to and around said first mentioned support then to one of the supports at the other end and to and around said cylindrical drum in gripping engagement therewith and then around the other support at the other end and to said actuator, a second flexible cable extending from said spring to a support at said other end of said guideways and then to said conical drum for accumulation thereon upon extension of said spring, a crank movable with said drums for extending said spring, and a member on said pusher member for engagement with a member on said upper guideway for actuating said upper guideway elevating members.

7. Apparatus for feeding elongated stock to a machine tool comprising a horizontal elongated frame tube, a lower elongated hollow guideway carried by said frame tube, an upper elongated hollow guideway complemental to said lower guideway and separable with respect thereto, said upper guideway in one position acting with said lower guideway to guide a piece of stock, said lower guideway having a plurality of longitudinally spaced horizontal shafts extending transversely therebelow, arms carried by said shafts and pivotally connected to said upper guideway for elevating said upper guideway with respect to said lower guideway to permit the insertion of a piece of stock within said guideways, said arms holding said guideways in said one position of said upper guideway for guiding the stock, a pusher member slidably guided in said guideways, said guideways having a slot therealong, an actuator for said pusher member movable along said slot, an elongated spring, and operating connections interposed between said spring and said actuator for applying a pushing force to said actuator.

References Cited in the file of this patent

UNITED STATES PATENTS

| 2,577,203 | Mariotte | Dec. 4, 1951 |
| 2,674,779 | Herzog | Apr. 13, 1954 |

FOREIGN PATENTS

| 273,152 | Switzerland | Jan. 31, 1951 |
| 729,981 | France | Aug. 4, 1932 |
| 1,081,953 | France | Dec. 24, 1954 |